(12) United States Patent
Agnew et al.

(10) Patent No.: US 6,292,137 B1
(45) Date of Patent: Sep. 18, 2001

(54) DIRECTION INDICATING COMPASSES

(75) Inventors: Hugh John Agnew; Gwyn David Walter Parfitt, both of Hampshire (GB)

(73) Assignee: Yeoman Marine Limited, Hampshire (GB)

(*) Notice: Subject to any disclaimer, the term of this patent is extended or adjusted under 35 U.S.C. 154(b) by 0 days.

(21) Appl. No.: 09/188,973

(22) Filed: Nov. 10, 1998

(30) Foreign Application Priority Data

Nov. 12, 1997 (GB) .................................... 9723926

(51) Int. Cl.[7] ........................... G01S 5/04; G01C 17/02
(52) U.S. Cl. .................... 342/443; 342/419; 33/355 R
(58) Field of Search ................................. 342/419, 417, 342/432, 357.08, 443; 33/355 R

(56) References Cited

U.S. PATENT DOCUMENTS

| 3,469,262 | * | 9/1969 | Frieling | 342/419 |
| 4,225,867 | | 9/1980 | Gell . | |
| 4,768,153 | | 8/1988 | Akamatsu . | |
| 5,146,231 | | 9/1992 | Ghaem et al. . | |
| 5,173,709 | * | 12/1992 | Lauro et al. | 342/443 |
| 5,790,477 | * | 8/1998 | Hauke | 368/10 |

FOREIGN PATENT DOCUMENTS

| WO 93 05474A | 3/1993 | (WO) . |

OTHER PUBLICATIONS

Patent Abstracts of Japan, vol. 17 No. 550 (P–1624), Oct. 4, 1993 & JP 05 7576 A (Matsushita Electric Ind Co Ltd), Jun. 22, 1993.

* cited by examiner

*Primary Examiner*—Gregory C. Issing
(74) *Attorney, Agent, or Firm*—Corbin & Gittes

(57) ABSTRACT

A portable compass comprises a body (18) and a compass needle (22) mounted on the body for indicating North/South. A bearing signal representing a required bearing is received, for example from a GPS receiver, and a display (30) responsive to the bearing signal receiving means indicates a required position of the compass needle relative to the body. A fixed indicator (26) on the body points to the required bearing when the body is oriented so that the compass needle is in the required position relative to the body.

13 Claims, 1 Drawing Sheet

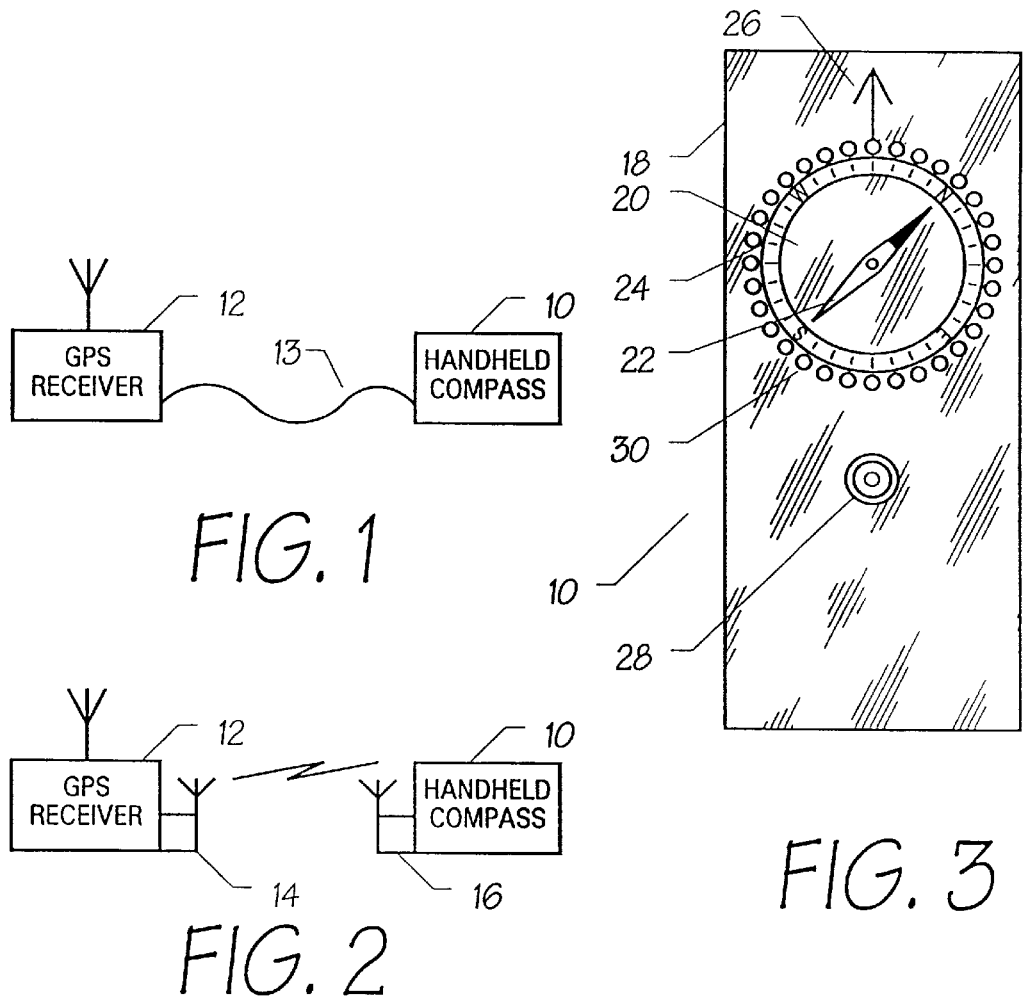
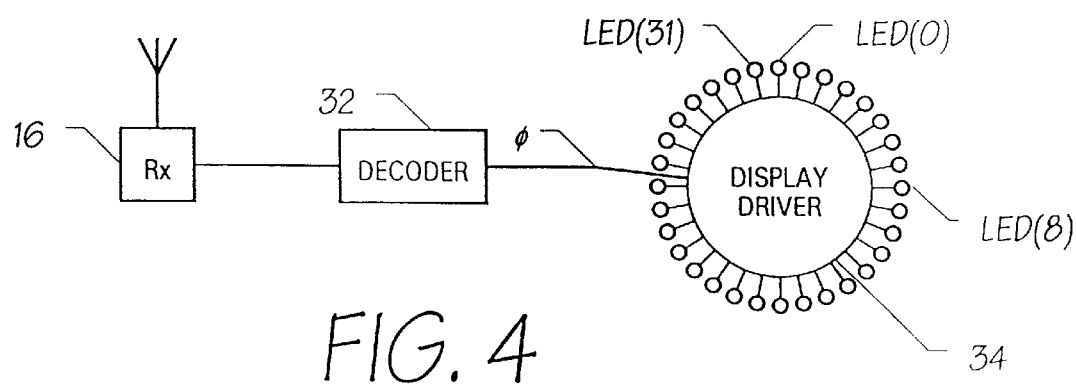

DIRECTION INDICATING COMPASSES

This invention relates to direction indicating compasses.

A traditional compass, for example as used by an orienteer, comprises a body, a compass needle mounted on the body for indicating North/South, a rotary bezel mounted around the compass needle and marked with the points of the compass, and an indicator (such as an arrow) marked on the body. When the user wishes to travel in a particular direction, they set the bezel so that the required direction is aligned with the indicator, turn themselves and the body until the North marking on the bezel is aligned with the North end of the compass needle, and then set off in the direction of the indicator, keeping the North marking on the bezel aligned with the North end of the compass needle.

With the advent of the global positioning system ("GPS"), GPS receivers have become popular. Some of these receivers, in addition to displaying one's current position, can determine and display the bearing from one's current position to a pre-entered waypoint. The user can then set the bearing on the bezel of a traditional compass, and then use the compass in the traditional way.

U.S. Pat. No. 5,146,231 describes an electronic direction finder which employs a GPS receiver and an electronic compass to provide a user with an indication of a bearing to be taken to get from a current position to a desired destination/waypoint. The device uses a directional antenna which rotates relative to the handset and which identifies the bearing towards a specific GPS satellite whose position is known to the GPS receiver. From this information, the device determines a reference bearing and provides an indication to the user of the required bearing relative to the hand held device in order to get to the desired destination. The device indicates the required direction by displaying an arrow on a liquid crystal display. The display also displays the image of a compass which includes a North, South, East and West indications together with orthogonal line segments connecting North to South and East to West respectively.

Apart from having the disadvantage of requiring a rotating antenna which may be damaged during normal use, the device disclosed in U.S. Pat. No. 5,146,231 also suffers from the disadvantage that two indicators are displayed to a user on a liquid crystal display, one of which changes as the orientation of the hand held device changes. In particular, the display of the compass will change as the orientation of the handset is changed and this may cause confusion to the operator and also draws power from the battery thereby reducing the time that the device can be used without having to recharge the batteries.

In accordance with the present invention, there is provided a portable direction indicating device comprising: a body; means mounted on the body for indicating the direction of a reference bearing; means for receiving a bearing signal representing a required bearing (for example from a GPS receiver); a display responsive to the bearing signal receiving means for indicating a required position of the reference bearing indicating means relative to the body; and an indicator on the body which points to the required bearing when the body is oriented so that the reference bearing indicating means is in the required position relative to the body. The device therefore operates like a conventional compass, but does not require the user to set the required bearing on the device. Preferably, for simplicity, the reference bearing indicating means comprises a compass needle which indicates North/South. Such an embodiment has the further advantage that if the power supply fails, then the user can still use the traditional compass needle in order to navigate.

The invention has a number of important advantages, including: (a) it removes the need for the user to set their bearing on the compass; (b) if the user does not travel exactly along the required bearing, the indicated bearing on the compass automatically adjusts itself; and (c) once the waypoint is reached and a new waypoint is selected, the indicated bearing on the compass is automatically updated.

In one embodiment of the invention, the display comprises a circular array of indicators concentric with the compass needle, a selected one of the indicators being activated to indicate the required position of the compass needle. In another embodiment, the display comprises a rotary indicator concentric with the compass needle and means for turning the rotary indicator so as to indicate the required position of the compass needle.

The signal receiving means may be arranged to receive the bearing signal from a separate navigation aid (such as a GPS receiver), and the invention extends to the compass in combination with such a navigation aid. The body, compass needle and indicator are provided as a first unit, and the bearing receiving means and display are provided as a second unit permanently or releasably attachable to the first unit. The invention also extends to such a second unit per se which can be used with an existing compass.

Alternatively, an integrated device may be provided, with the body housing a navigation aid which supplies the bearing signal to the signal receiving means.

Specific embodiments of the present invention will now be described, purely by way of example, with reference to the accompanying drawings, in which:

FIG. 1 is a block diagram of a combination of a compass and a GPS receiver with a wire link between them;

FIG. 2 is a block diagram of a combination of a compass and a GPS receiver with a wireless link between them;

FIG. 3 is a plan view of the compass; and

FIG. 4 is a block diagram of the novel parts of the compass.

In the embodiment of FIG. 1, a hand held compass 10 is connected to a serial data port of a conventional GPS receiver 12 by a wire link 13. The GPS receiver 12 supplies to the compass data including a required bearing, determined by the GPS receiver 12 from its currently determined position and a previously entered waypoint. In an alternative embodiment, as shown in FIG. 2, a small, short-range, radio or inductive transmitter 14 is connected to the serial data port of the GPS receiver 12, and the compass 10 includes a complementary receiver 16 which receives the bearing data.

Referring to FIG. 3, the compass 10 comprises a generally rectangular plate 18, on which is mounted a transparent chamber 20 containing a magnetic compass needle 22 supported on a pivot pin. One end of the compass needle 22 is coloured and points to North. A rotary bezel 24 surrounds the chamber 20 and is marked with the points of the compass. One end of the plate 18 is marked with an arrow 26. A spirit level or a magnifying glass region 28 may also be provided. As described so far with reference to FIG. 3, the compass 10 is conventional.

As also shown in FIG. 3, the bezel 24 is surrounded by a circular array of indicator lights 30, such as LEDs. In the embodiment shown, there are thirty-two such LEDs 30, angularly spaced by $360°/32=11¼°$. Referring now to FIG. 4, the compass also includes a decoder 32 which receives the signal from the receiver 16 (FIG. 2) or wire link 13 (FIG. 1) and extracts the required bearing therefrom. In the remainder of this description, the required bearing, in degrees clockwise from North, will be denoted as $\Phi$ where $0° \leq \Phi < 360°$, and the number of the indicators will be denoted as N, N being 32 in the example given. The bearing $\Phi$ is supplied to a display driver 34, which drives the LEDs 30. With reference to FIG. 4, the LEDs 30 are denoted as LED(0) to LED(31) ordered in the clockwise direction, with LED(0) being aligned with the arrow 26. The display driver lights up one of the LEDs, LED(i), in response to the bearing $\Phi$, where i is determined from $\{int[\frac{1}{2}+N(1-(\Phi/360))]\}modN$, where int[ ] means the integer part of, and { }modN denotes modular arithmetic to base N. Thus the number of degrees clockwise from North of the required bearing $\Phi$ is generally equal to the number of degrees anticlockwise (rather than clockwise) from LED(0) of the LED which is lit up. Accordingly, the user can travel in the required direction by turning themself and the compass 10 until the lit LED 30 is aligned with the North end of compass needle 22, and then travelling in the direction of the arrow 26.

It will be appreciated that many modifications and developments may be made to the embodiment of the invention described above. For example, rather than distinct indicators 30, a graphical display, for example an LCD, may be used (either over or under the compass needle) to indicate the required compass needle position, or a second needle driven by a micro-servo-motor may be used. The bezel 24 may be omitted, but preferably it is included so that the compass may still be used in the traditional way. The novel parts of the compass may be provided as one unit which is releasable or permanently attachable beneath an existing traditional compass having a plate 18 which is transparent in the region of the compass needle 22 so that the indicator(s) can be seen through the plate 18. Also, the compass may be provided as an integral part of the GPS receiver 12, rather than being a separate unit. Furthermore, the apparatus for determining the required bearing may use navigation systems other than GPS.

In the above embodiment, a magnetic needle is used to provide a reference bearing. Whilst the use of such a magnetic needle is preferred because of its simplicity, other techniques can be used to provide a reference bearing. For example, the hand held compass 10 may comprise a magnetic flux gate compass (such as the one described in U.S. Pat. No. 5,173,709) which senses the earth's magnetic field and outputs an appropriate electronic signal for controlling a display to display a reference bearing, such as North. Although such electronic compasses can be used, they are not preferred because of the increased cost and complexity of the hand held compass 10.

What is claimed is:

1. A portable compass for directing a user toward a predetermined geographical location, the compass comprising:
   a body (18);
   a compass needle (22) mounted on the body for indicating North/South;
   means (16) for receiving a bearing signal representing a required bearing to said predetermined geographical location;
   a display (30) responsive to the bearing signal receiving means to indicate a required position of the compass needle relative to the body; and
   a fixed indicator (26) on the body which points towards the predetermined geographical location when the body is oriented so that the compass needle is in the required position relative to the body indicated by the display.

2. A compass as claimed in claim 1, wherein the display comprises a circular array of indicators (30) concentric with the compass needle, a selected one of the indicators being activated to indicate the required position of the compass needle.

3. A compass as claimed in claim 1, wherein the display comprises a rotary indicator concentric with the compass needle and means for turning the rotary indicator so as to indicate the required position of the compass needle.

4. A compass as claimed in claim 1, wherein the signal receiving means is arranged to receive the bearing signal from a separate navigation aid (12).

5. A compass as claimed in claim 4, in combination with such a navigation aid.

6. A compass as claimed in claim 1, wherein the body, compass needle and indicator are provided as a first unit, and the bearing receiving means and display are provided as a second unit permanently or releasably attachable to the first unit.

7. A compass as claimed in claim 1, wherein the body houses a navigation aid which supplies the bearing signal to the signal receiving means.

8. A portable direction indicating device for directing a user toward a predetermined geographical location, the device comprising:
   a body;
   means mounted on the body for indicating the direction of a reference bearing regardless of the orientation of the body;
   means for receiving a bearing signal representing a required bearing to said predetermined geographical location relative to said reference bearing;
   a display responsive to the bearing signal receiving means to indicate a required position of the reference bearing indicating means relative to the body; and
   a fixed indicator on the body which points towards the predetermined geographical location when the body is oriented so that the reference bearing indicating means is in the required position relative to the body indicated by the display.

9. A compass according to claim 8, wherein said indicating means mounted on said body is operable to indicate magnetic North as said reference bearing.

10. A compass according to claim 9, wherein said means for indicating magnetic North comprises a magnetic needle pivotally mounted to the body.

11. A portable compass comprising a body;
   a direction indicator mounted on the body and arranged to indicate a direction of a reference bearing regardless of an orientation of the body;
   a receiver of a bearing signal that represents a required bearing;
   a display responsive to the receiver to indicate a required position of the direction indicator relative to the body; and
   an indicator on the body arranged to point to the required bearing as the body becomes oriented into a position with respect to the direction indicator so that the direction indicator enters into the required position relative to the body.

12. A compass as in claim 11, wherein the display includes a circular array of distinct indicators concentric with the direction indicator, a selected one of the district indicators being arranged to activate to indicate the required position of the direction indicator.

13. A compass in claim 11, wherein the display includes a rotary indicator concentric with the direction indicator and arranged to rotate between a plurality of relative positions so as to indicate the required position of the direction indicator at one of the plurality of relative positions.

* * * * *